(12) United States Patent
Tuers et al.

(10) Patent No.: US 9,507,704 B2
(45) Date of Patent: Nov. 29, 2016

(54) STORAGE MODULE AND METHOD FOR DETERMINING READY/BUSY STATUS OF A PLURALITY OF MEMORY DIES

(71) Applicant: SanDisk Technologies Inc., Plano, TX (US)

(72) Inventors: Daniel E. Tuers, Kapaa, HI (US); Abjiheet Manohar, Bangalore (IN); Yoav Weinberg, Thornhill (CA)

(73) Assignee: SanDisk Technologies LLC, Plano, TX (US)

( * ) Notice: Subject to any disclaimer, the term of this patent is extended or adjusted under 35 U.S.C. 154(b) by 387 days.

(21) Appl. No.: 14/448,728

(22) Filed: Jul. 31, 2014

(65) Prior Publication Data

US 2015/0363342 A1 Dec. 17, 2015

(30) Foreign Application Priority Data

Jun. 13, 2014 (IN) .......................... 2893/CHE/2014

(51) Int. Cl.
G06F 13/42 (2006.01)
G06F 12/02 (2006.01)

(52) U.S. Cl.
CPC ....... *G06F 12/0238* (2013.01); *G06F 13/4243* (2013.01); *Y02B 60/1228* (2013.01); *Y02B 60/1235* (2013.01)

(58) Field of Classification Search
CPC ........... G06F 12/0238; G06F 13/4243; Y02B 60/1228; Y02B 60/1235
See application file for complete search history.

(56) References Cited

U.S. PATENT DOCUMENTS

| | | | | |
|---|---|---|---|---|
| 8,433,845 B2* | 4/2013 | Borchers | ............. | G06F 12/0813 711/103 |
| 2011/0202690 A1* | 8/2011 | Chu | ...................... | G06F 1/3203 710/14 |
| 2014/0019676 A1* | 1/2014 | Huffman | ................ | G11C 16/10 711/103 |
| 2014/0189451 A1* | 7/2014 | Booth | ................. | G06F 13/4243 714/721 |
| 2015/0120990 A1* | 4/2015 | Chu | ...................... | G06F 3/0659 711/103 |

* cited by examiner

*Primary Examiner* — Glenn A Auve
(74) *Attorney, Agent, or Firm* — Brinks Gilson & Lione (57) ABSTRACT

A storage module and method are provided for determining ready/busy status of a plurality of memory dies. In one embodiment, a bus has a ready/busy line that is shared among the plurality of memory dies, and a time-division multiplex signal on the shared ready/busy line is used to communicate the ready/busy status of each of the memory dies. In another embodiment, each of the memory dies sends its ready/busy status to the storage controller using a different one of a plurality of data lines in the bus. In yet another embodiment, each of the memory dies sends a pulse across the ready/busy line with a different pulse width. To avoid collisions, each memory die waits a different number of clock cycles before attempting to send its pulse status after determining that the shared ready/busy line is in use.

22 Claims, 6 Drawing Sheets

STORAGE MODULE AND METHOD FOR DETERMINING READY/BUSY STATUS OF A PLURALITY OF MEMORY DIES

PRIORITY

This application claims priority to India Patent Application No. 2893/CHE/2014, filed on Jun. 13, 2014, entitled "Storage Module and Method for Determining Ready/Busy Status of a Plurality of Memory Dies," the entire disclosure of which is hereby incorporated by reference.

BACKGROUND

A storage controller in a storage module that contains a plurality of memory dies (e.g., in a multi-die package) needs to know the ready/busy status of the memory dies in order to know when it can send a command to a given memory die. In many storage bus architectures, there is only one ready/busy line, which is shared among all of the memory dies. As such, the storage controller may need to poll each memory die individually for its ready/busy status by continuously changing the die number and issuing a check status command. This approach involves a lot of firmware activity in the controller and requires a lot of power to the controller and bus. Also, there is latency in the time a memory die completes an activity to the time the firmware in the storage controller realizes that the memory die has become ready. Accordingly, determining ready/busy status by polling the memory dies often results in power and performance disadvantages. Instead of polling the memory dies, the storage controller can use a series of timers to estimate when a given memory die will complete an operation and become ready. However, this approach adds complexity to the storage controller and may not provide a true indication of readiness, especially when a memory die takes more time than expected to complete an operation. Another approach uses pulse code modulation of a ready/busy signal; however, collisions can be a problem in that approach.

Overview

Embodiments of the present invention are defined by the claims, and nothing in this section should be taken as a limitation on those claims.

By way of introduction, the below embodiments relate to a storage module and method for determining ready/busy status of a plurality of memory dies. In one embodiment, a storage module is provided comprising a storage controller, a bus, and a plurality of memory dies in communication with the storage controller via the bus. The bus has a ready/busy line that is shared among the plurality of memory dies, and the plurality of memory dies are configured to provide a time-division multiplex signal on the shared ready/busy line to communicate the ready/busy status of each of the memory dies to the storage controller.

In another embodiment, a storage module is provided comprising a storage controller, a bus, and a plurality of memory dies in communication with the storage controller via the bus. The storage controller is configured to place the storage module in either a first mode of operation or in a second mode of operation. In the first mode of operation, a plurality of data lines in the bus are used to transfer data between one of the memory dies and the storage controller. In the second mode of operation, the plurality of data lines are used to communicate ready/busy status information of the plurality of memory dies to the storage controller, wherein each of the memory dies sends its ready/busy status to the storage controller using a different one of the plurality of data lines.

In yet another embodiment, a storage module is provided comprising a storage controller, a bus, and a plurality of memory dies in communication with the storage controller via the bus. The bus has a ready/busy line that is shared among the plurality of memory dies. Each of the plurality of memory dies is configured to indicate its ready/busy status by sending a pulse across the ready/busy line with a pulse width that is different from those used by the other memory dies. To avoid collisions, each of the plurality of memory dies is further configured to wait a different number of clock cycles before attempting to send its pulse status after determining that the shared ready/busy line is in use.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

As mentioned in the background section above, determining the ready/busy status of a plurality of memory dies may require polling each memory die individually for its ready/busy status, which can consume power and result in performance disadvantages. The following embodiments provide a storage module and method for determining ready/busy status of a plurality of memory dies that overcome these issues and provide improved power and performance. Before turning to these and other embodiments, the following paragraphs provide a discussion of exemplary storage modules that can be used with these embodiments. Of course, these are just examples, and other suitable types of storage modules can be used.

Figure 1:
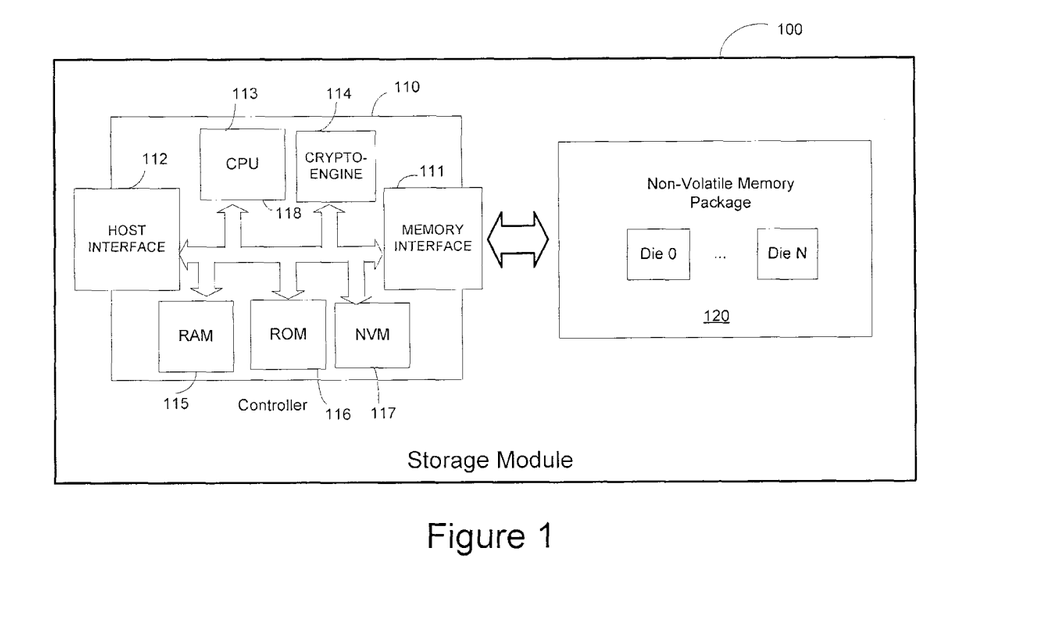
FIG. 1 is a block diagram of an exemplary storage module of an embodiment.

As illustrated in FIG. 1, a storage module 100 of one embodiment comprises a storage controller 110 and a non-volatile memory package 120 containing a plurality of memory dies (Die 0 to Die N). Although only one non-volatile memory package is shown in FIG. 1, it should be understood that the storage module 100 can have more than one non-volatile memory package. The storage controller 110 comprises a memory interface 111 for interfacing with the non-volatile memory package 120 and a host interface 112 for placing the storage module 100 operatively in communication with a host controller. As used herein, the phrase "operatively in communication with" could mean directly in communication with or indirectly in (wired or wireless) communication with through one or more components, which may or may not be shown or described herein.

Figure 2A:
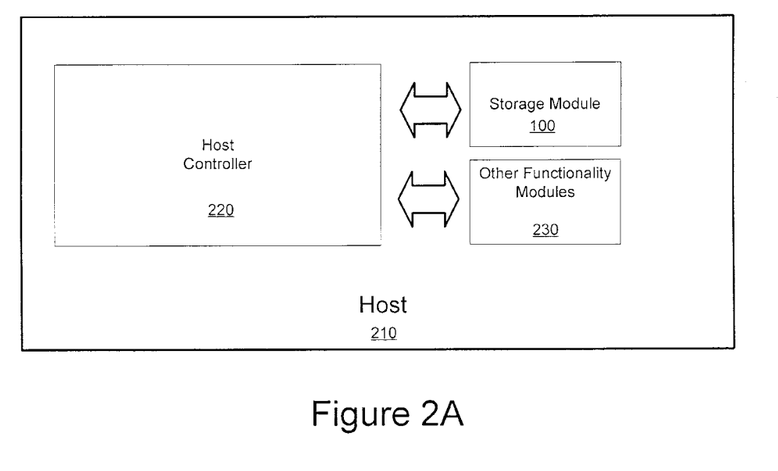
FIG. 2A is a block diagram of a host of an embodiment, where the exemplary storage module of FIG. 1 is embedded in the host.

As shown in FIG. 2A, the storage module 100 can be embedded in a host 210 having a host controller 220. That is, the host 210 embodies the host controller 220 and the storage module 100, such that the host controller 220 interfaces with the embedded storage module 100 to manage its operations. For example, the storage module 100 can take the form of an iNAND™ eSD/eMMC embedded flash drive by SanDisk Corporation, or, more generally, any type of solid state drive (SSD), a hybrid storage device (having both a hard disk drive and a solid state drive), and a memory caching system. The host controller 220 can interface with the embedded storage module 100 using, for example, an eMMC host interface or a UFS interface. The host 210 can take any form, such as, but not limited to, a mobile phone, a tablet computer, a digital media player, a game device, a personal digital assistant (PDA), a mobile (e.g., notebook, laptop) personal computer (PC), or a book reader. As shown in FIG. 2A, the host 210 can include optional other functionality modules 230. For example, if the host 210 is a mobile phone, the other functionality modules 230 can include hardware and/or software components to make and place telephone calls. As another example, if the host 210 has network connectivity capabilities, the other functionality modules 230 can include a network interface. Of course, these are just some examples, and other implementations can be used. Also, the host 210 can include other components (e.g., an audio output, input-output ports, etc.) that are not shown in FIG. 2A to simplify the drawing. It should be noted that while the host controller 220 can control the storage module 100, the storage module 100 can have its own controller to control its internal memory operations. Also, in general, a host controller can be any controller capable of interfacing with the storage module, be it a controller in monolithic form, an entire controller, or a separate functionality module.

Figure 2B:
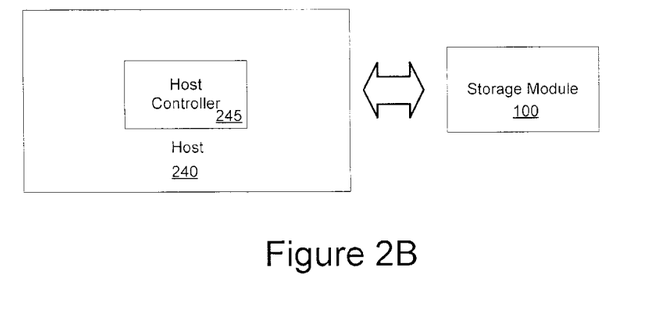
FIG. 2B is a block diagram of the exemplary storage module of FIG. 1 removably connected to a host, where the storage module and host are separable, removable devices.

As shown in FIG. 2B, instead of being an embedded device in a host, the storage module 100 can have physical and electrical connectors that allow the storage module 100 to be removably connected to a host 240 (having a host controller 245) via mating connectors. As such, the storage module 100 is a separate device from (and is not embedded in) the host 240. In this example, the storage module 100 can be a handheld, removable memory device, such as a Secure Digital (SD) memory card, a microSD memory card, a Compact Flash (CF) memory card, a universal serial bus (USB) device (with a USB interface to the host), or a solid-state drive (SSD), and the host 240 is a separate device, such as a mobile phone, a tablet computer, a digital media player, a game device, a personal digital assistant (PDA), a mobile (e.g., notebook, laptop) personal computer (PC), or a book reader, for example.

In FIGS. 2A and 2B, the storage module 100 is in communication with a host controller 220 or host 240 via the host interface 112 shown in FIG. 1. The host interface 112 can take any suitable form, such as, but not limited to, an eMMC host interface, a UFS interface, and a USB interface. The host interface 110 in the storage module 110 conveys memory management commands from the host controller 220 (FIG. 2A) or host 240 (FIG. 2B) to the storage controller 110, and also conveys memory responses from the storage controller 110 to the host controller 220 (FIG. 2A) or host 240 (FIG. 2B). Also, it should be noted that when the storage module 110 is embedded in the host 210, some or all of the functions described herein as being performed by the storage controller 110 in the storage module 100 can instead be performed by the host controller 220.

Returning to FIG. 1, the storage controller 110 comprises a central processing unit (CPU) 113, an optional hardware crypto-engine 114 operative to provide encryption and/or decryption operations, read access memory (RAM) 215, read only memory (ROM) 116 which can store firmware for the basic operations of the storage module 100, and a non-volatile memory (NVM) 117 which can store a device-specific key used for encryption/decryption operations, when used. The storage controller 110 can be implemented in any suitable manner. For example, the storage controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Suitable controllers can be obtained from SanDisk or other vendors. The storage controller 110 can be configured with hardware and/or software to perform the various functions described below and shown in the flow charts. Also, some of the components shown as being internal to the storage controller 110 can also be stored external to the storage controller 110, and other component can be used. For example, the RAM 115 (or an additional RAM unit) can be located outside of the controller die and used as a page buffer for data read from and/or to be written to the memory package 120.

The memory dies in the non-volatile memory package 120 can also take any suitable form. For example, in one embodiment, one or more of the memory dies take the form of a solid-state (e.g., flash) memory and can be one-time programmable, few-time programmable, or many-time programmable. The memory dies can also use single-level cell (SLC), multiple-level cell (MLC), triple-level cell (TLC), or other memory technologies, now known or later developed. Also, the memory dies can be a two-dimensional memory or a three-dimensional memory.

Figure 3:
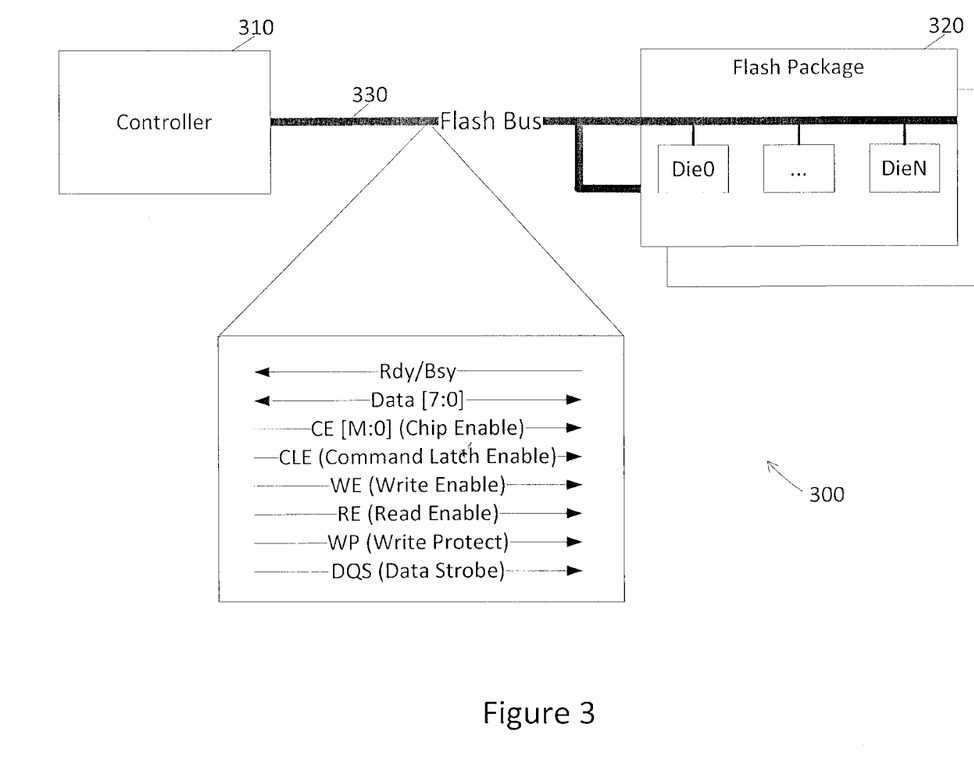
FIG. 3 is a block diagram of a bus of an embodiment.

Turning again to the drawings, FIG. 3 is a diagram of an exemplary storage module 300 of an embodiment. This storage module 300 comprises a storage controller 310 in communicate with one or more flash memory packages 320, each containing a plurality of memory dies (Die 0 to Die N). FIG. 3 also shows a flash bus 330 placing the controller 310 in communication with the flash packages 320. As shown in FIG. 3, the flash bus 330 in this embodiment contains a single ready/busy line (sometimes referred to herein as a pin), eight lines for transferring data between the controller 310 and the flash packages 320, M chip enable lines to enable a selected one of the memory dies, a command latch enable line, a write enable line, a read enable line, a write protect line, and a DQS data strobe line. Because the flash bus 330 only has one ready/busy line, the memory dies in the flash packages 320 can be polled individually by selecting a single memory die at any given time, so the selected memory die can send back its ready/busy status of the shared line. However, as noted above, this process can consumer power and result in performance disadvantages. The following embodiments can be used to avoid these disadvantages.

In one embodiment, the plurality of memory dies are configured to provide a time-division multiplex signal on the shared ready/busy line to indicate the ready/busy status of each of the memory dies to the storage controller. By using a time-division multiplex signal, each of the memory dies can provide their ready/busy line on the shared ready/busy line without having to poll the memory dies individually. This reduces power consumption and improves performance. This embodiment will be discussed in more detail in conjunction with FIG. 4.

Figure 4:
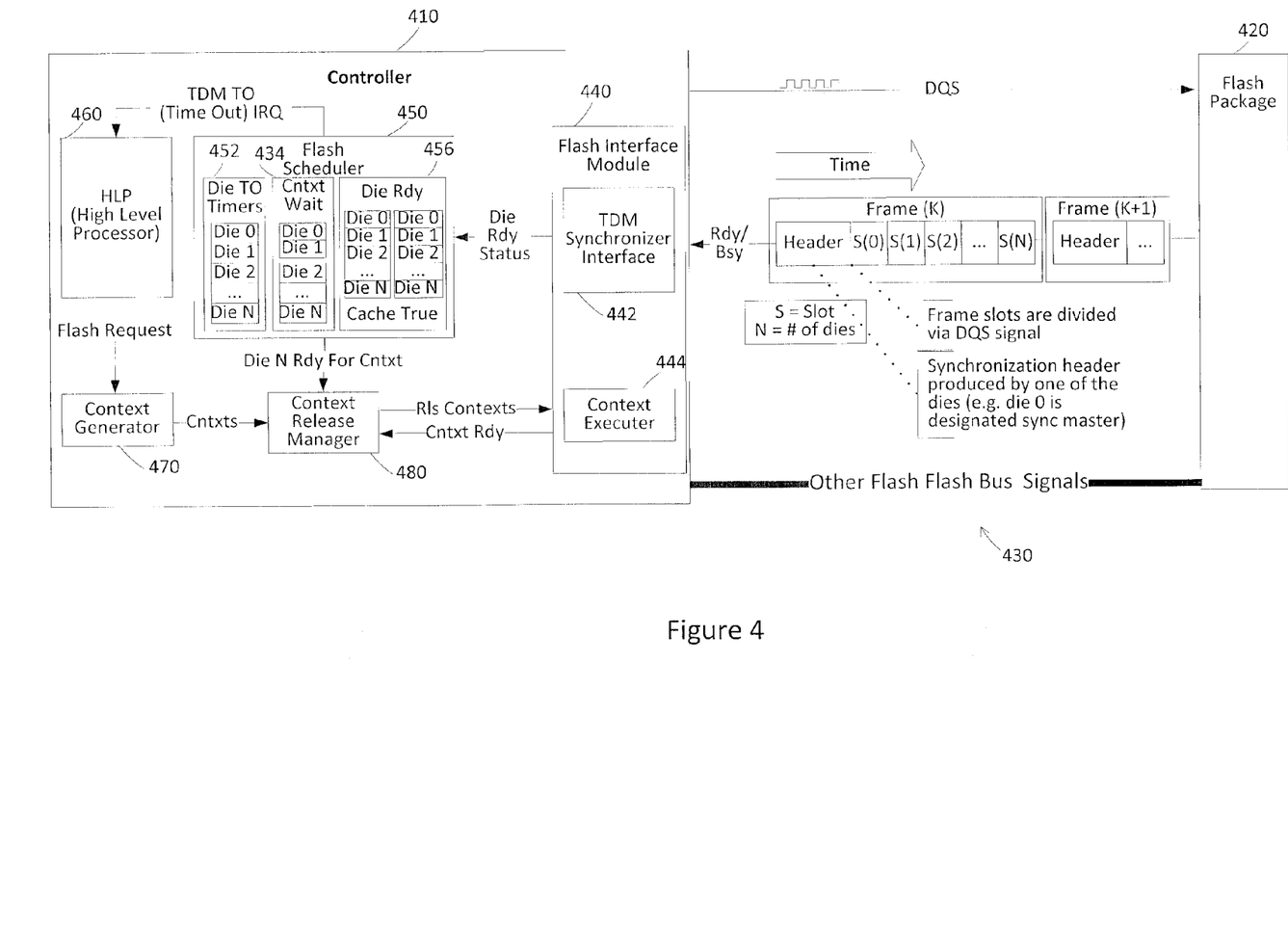
FIG. 4 is a block diagram of an exemplary storage module of an embodiment in which a time-division multiplex signal on a shared ready/busy line communicates the ready/busy status of each memory die.

FIG. 4 shows a storage module 400 with a storage controller 410 in communication with a flash package 420 having N memory dies via a bus 430. The storage controller 410 comprises a flash interface module 440 having a TDM synchronizer interface 442 and a context executor 444. The storage controller 410 also comprises a flash scheduler 450 with a die time-out timer 452, a context wait table 454, and a die ready table 456. The flash scheduler 450 communicates with a high-level processor, which provides flash requests to a content generator 470. A context release manager 480 receives contexts from the context generator 470 and a "die N ready for context" signal from the flash scheduler 450 and provides a release context command to the flash interface module 440.

The plurality of memory dies in the flash package 420 are configured to provide a time-division multiplex ("TDM") signal on the shared ready/busy line of the bus 430 to communicate the ready/busy status of each of the memory dies to the storage controller 410 on a single pin. In this way, the status of all the memory dies can be presented one after the other in a time-division multiplex sequence. In operation, a clearly-distinguishable header sequence is defined, so that the memory dies and the storage controller 410 will not go out of synch on the time-division multiplex sequence. In one embodiment, this is done by configuring one of the memory dies to broadcast a synchronization packet to the other memory dies and to the storage controller 410. This creates a "pack synchronicity," where all the memory dies recognize the start of the TDM window at same time. This synchronization packet can be the header of the time-division multiplex signal to the storage controller 410. The header could contain a pattern that is recognized by the memory dies and the storage controller 410 as a uniquely-distinguishable pattern from the normal status. For example, the pattern in the header can be 0101_1010_0101_1010, as such a pattern of digits would never occur as a normal ready/busy status, as a normal ready/busy signal would not toggle so rapidly. When the storage controller 410 powers up, it may be preferred for the storage controller 410 to wait for this pattern to occur on the ready/busy line before assuming synchronization on the bus. Until synchronization is achieved, the storage controller 410 can ignore the ready/busy bus status. It may also be preferred to repeat the header pattern at regular intervals to make sure the memory dies and the storage controller 410 are in sync. Alternatively, a periodic sync packet can be sent from the storage controller 410 frequently enough to ensure that all memory dies and the storage controller 410 stay in sync.

The synchronization packet prompts the memory dies to provide their ready/busy status, and each of the memory dies is configured to provide their ready/busy status as a different time with respect to the synchronization packet. It is preferred that some sort of clock signal be provided, so each of the memory dies will know when they should provide its ready/busy status on the shared ready/busy line of the bus 430. In one embodiment, the storage controller 410 is configured to provide the plurality of memory dies with a clock signal, and each of the memory dies is configured to provide a ready/busy pulse of one clock cycle at a different number of clock cycles after receiving the synchronization packet. In this way, each memory die would know what "slot" to put its pulse cycle in the time-division multiplex signal, as the clock signal would provide timing closure for every slot.

While any suitable clock signal can be used, in one embodiment, the clock signal is a DQS data strobe signal from the storage controller 410. A DQS data strobe signal is a signal provided by the storage controller 410 in order to latch data in to and out of the memory dies in read and write operations. Although not intentionally designed as a clock signal, the DQS data strobe is a constant toggling signal, which can be used as a clock signal. Plus, because a storage controller generates the DQS data strobe as part of its regular operations, no additional overhead is required in providing a special clock for time-division multiplexing. Additionally, the DQS data strobe runs at a faster rate than a conventional clock used in a NAND memory die (e.g., 400 or 800 MHz vs. 1 MHz).

Returning to FIG. 4, FIG. 4 shows the bus 430 carrying a time-division multiplex signal on the shared ready/busy line of the bus 430 consisting of several frames of ready/busy information, where each frame contains the header and the ready/busy packets for all N memory dies. Until the storage controller 410 receives the time-division multiplex signal, the storage controller 410 can perform other operations. However, when the storage controller 410 receives the time-division multiplex signal, the TDM synchronizer interface 444 of the flash interface module 440 decodes the time-division multiplex signal and extracts the busy/ready status of each individual memory die and provides the status to the flash scheduler 450. The flash scheduler 450 keeps track of the cache ready and true ready status of each memory die, as well as what contexts are waiting for those memory dies. (As used herein, a context is a stream of command that are to be performed.) When a change in the busy/ready status is detected for any given memory die, the flash scheduler 450 knows that memory die is ready for a command and can send a command to that die. In this way, the flash scheduler 450 can schedule when commands are to be sent to each of the memory dies based on each of the memory die's ready/busy status. The timers 452 are used to determine if a time-out has occurred, so a potential fault can be identified.

There are several advantages associated with these embodiments. For example, using a time-division multiplex signal provides the storage controller 410 with the memory dies' ready/busy line status faster than polling the memory dies individually, and this provide better performance by increasing the die utilization rate. In many situations, a memory die's ready/busy status can be detected within a few hundred nanoseconds with these embodiments instead of a few microseconds when a polling-based approach is used. For example, consider a situation in which the bus 430 is operating at 50 MHz for 20 nanoseconds. The worst-case latency for detecting ready/busy status from power-up can be estimated by: Synchronization Time+Header Length+Die Number. Synchronization time equals the interval between headers. For an interval of say 100 cycles, this will be 2 microseconds. The header length in this example is 16 cycles, which results in a delay of 320 nanoseconds. For memory die 3, for example, it would cycle at 80 nanoseconds. This adds up to 2.4 microseconds. The worst-case latency for detecting status at any time after power-up can be estimated by: Header Length+Die Number. For a header length of 16 cycles (320 nanoseconds) and for Die 3 (4 cycles=80 nanoseconds), this adds up to 400 nanoseconds.

There are other advantages associated with these embodiments. For example, since the storage controller 410 would be relieved of polling activity, storage controller 410 performance is also improved. Also, power is saved by not having the storage controller 410 poll each of the memory dies and because the status interface can be operated at a much lower frequency than the NAND data interface. Further, by multiplexing a single bit on the ready/busy line, bus efficiency is increased as well. So, in general, these embodiments provide a simple mechanism to communicate the ready/busy status of all memory dies to the storage controller without firmware intervention and result in lower power consumption and better performance compared to prior polling techniques that required firmware intervention.

Figure 5:
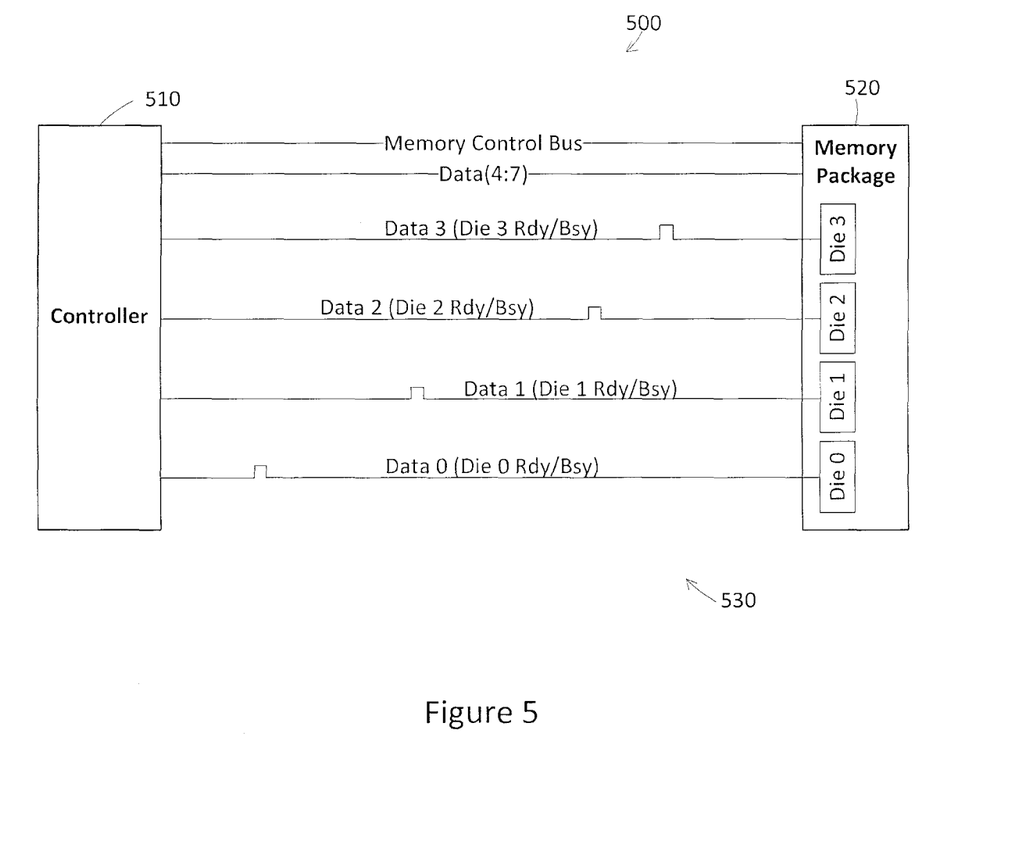
FIG. 5 is a block diagram of an exemplary storage module of an embodiment in which a plurality of data lines are used to communicate ready/busy status information of a plurality of memory dies to the storage controller.

There are many alternatives that can be used with these embodiments. For example, to avoid dealing with the timing issues involved in the time-division multiplex process, multiple data lines in the bus instead of the single, shared ready/busy line can be used to provide the ready/busy line status of each of the memory dies. In operation, the storage controller is configured to place the storage module in either a first mode of operation or in a second mode of operation. In the first mode of operation ("normal mode"), the plurality of data lines are used to transfer data between one of the memory dies and the storage controller. In the second mode of operation ("parallel status mode"), the plurality of data lines are used to communicate ready/busy status information of the plurality of memory dies to the storage controller, wherein each of the memory dies sends its ready/busy status to the storage controller using a different one of the plurality of data lines. This embodiment is shown in FIG. 5. As shown in FIG. 5, when the storage module 500 enters the second mode of operation, memory dies 0-3 in the memory package 520 use data lines 0-3, respectively, to send a pulse indicating its ready/busy status to the storage controller 510. Because each memory die has its own bus line to communicate with the storage controller 510 instead of a single, shared ready/busy line, this embodiment avoids any timing or bus collision issues.

In operation, when the storage controller 510 is waiting for more than one memory die to become ready, it can issue a broadcast command to cause each memory die to drive its ready/busy status on the data bus line assigned to that memory die. The signal driven on the data bus can be as simple as the legacy ready/busy status (e.g., high for ready, low for busy) or can be more complicated, such as a pattern of pulses. The advantage of this embodiment is that all the memory dies can independently drive their bus without complications in dealing with the legacy open drain on the ready/busy line. This "parallel status mode" can be exited by the storage controller 510 sending a signal to the memory dies indicating that it has made a decision and is ready to enter normal bus communication mode with a memory die to send a command to that memory die. This can be done, for example, by deselecting the column enable (CE) lines or an unused data line or by asserting/de-asserting any of the non-data bus lines.

Figure 6:
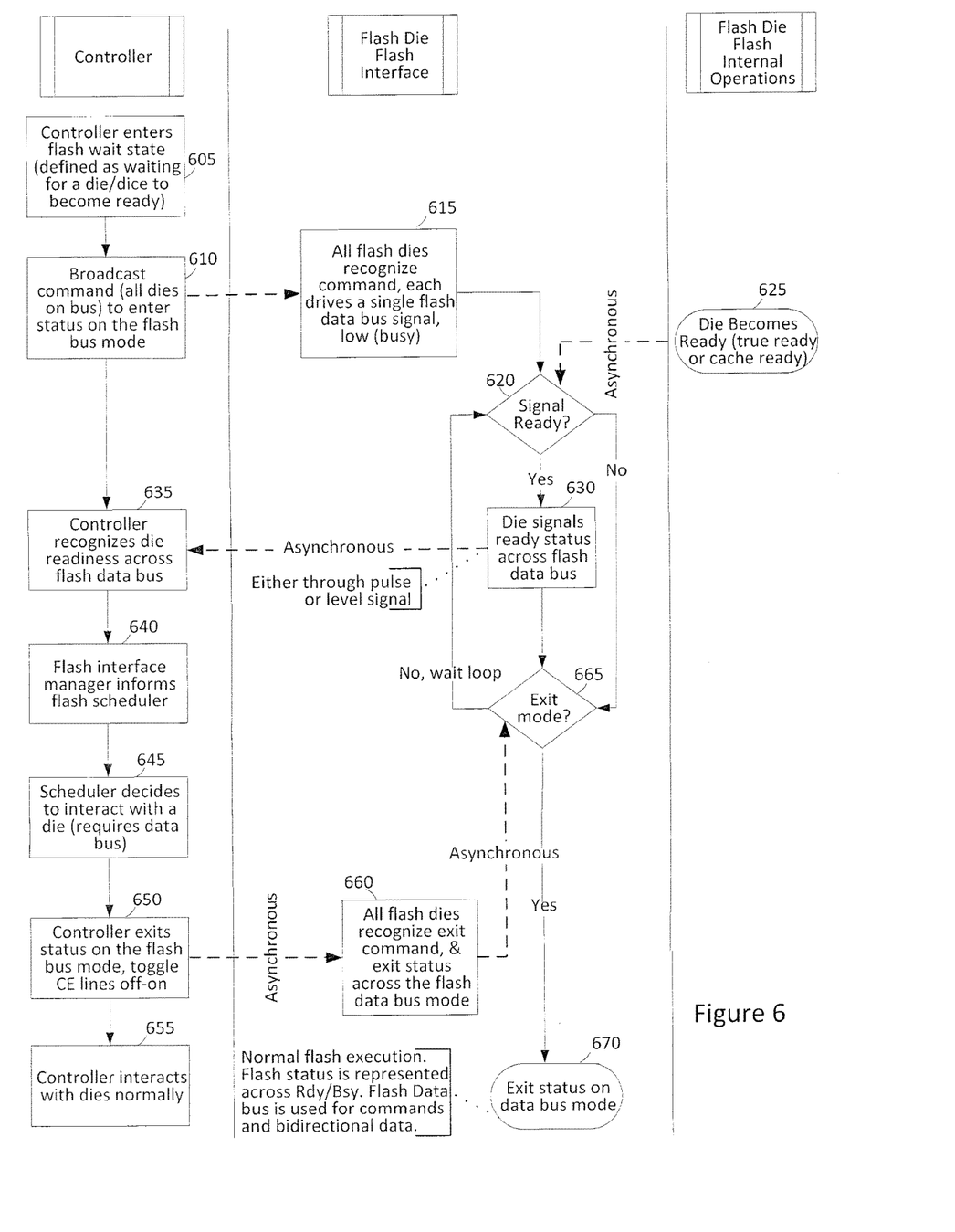
FIG. 6 is a flow chart of an embodiment for determining ready/busy status of a plurality of memory dies.

FIG. 6 provides a flow chart 600 that illustrates the roles of the storage controller, flash interface and internal flash die operations of one specific implementation of this embodiment. As shown in FIG. 6, the controller enters a flash wait state, defined as waiting for a die/dice to become ready (605). The controller then broadcasts a command to all dies on the bus to enter a mode where their ready/busy status is put on the flash bus (610). The flash interface of all the flash dies recognize this command and drive a single flash data busy signal low to indicate busy (615). The flash interface then determines if there is a ready signal (620). This can happen if a memory die becomes either true ready or cache ready (625). If the ready signal is detected, the die signals ready status across the flash data bus either through a pulse or a level signal (630). The flash interface manager then informs the flash scheduler (640), which decides to interact with a die (645). The controller then exits the status mode by, for example, toggling the column enable (CE) lines off and on (650). This allows the controller to interact with the dies normally (655). The dies recognize this exit command (660), which caused the mode to be exited (665, 670).

In yet another alternate embodiment, each of the plurality of memory dies is configured to indicate its ready/busy status by sending a pulse across a shared ready/busy line with a pulse width that is different from those used by the other memory dies (pulse width modulation). Because the pulse width from each memory die is different, the storage controller can know which memory die is sending the pulse. However, because the pulse is sent over a shared ready/busy line, a mechanism is needed to ensure that a pulse sent from one memory die does not collide with a pulse sent from another memory die. One prior approach to avoiding collisions is for a memory die to read the shared ready/busy line before sending out its pulse. If the memory die detects that the shared ready/busy line is in use, it waits for the line to become free before sending out its pulse. At the end of driving its pulse, the memory die can check the line again to make sure that the line is free. If it's busy, that may indicate that a collision occurred after the memory die sent out its pulse.

However, a problematic window can occur if two or more memory dies both detect another die driving the ready/busy line and then attempt to drive the line immediately following the termination of the conflicting communication, as they will both collide on the first free bus cycle. For example, consider the situation in which memory die 0 is sending its pulse on the ready/busy line, and memory dies 1 and 2 are ready to send their ready/busy status. Memory die 1 and 2 both sample the bus and determine that another memory die is driving the bus. So, both memory dies 1 and 2 wait for that transmission to end and then they both start driving the bus with their ready/busy status on the first cycle after the end of the transmission. This results in a collision.

To avoid this problem, in one embodiment, each of the plurality of memory dies is configured to wait a different number of clock cycles before attempting to send its pulse status after determining that the shared ready/busy line is in use. This form of time-division multiplexing can prevent collisions by preventing two memory dies from attempting to drive the bus on the first free cycle. For example, in the above illustration, instead of both memory dies 1 and 2 sending their ready/busy status on the first cycle after the end of a detected bus transmission, memory die 1 would wait one cycle before driving the bus (memory die 1 would be the master), and memory die 2 would wait two cycles from the end of the detected transmission. During that time, memory die 2 would see that memory die 1 has taken ownership and waits for memory die 1 to finish.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A storage module comprising:
a storage controller;
a bus; and
a plurality of memory dies in communication with the storage controller via the bus, wherein the bus has a ready/busy line that is shared among the plurality of memory dies, and wherein the plurality of memory dies are configured to provide a time-division multiplex signal on the shared ready/busy line to communicate the ready/busy status of each of the memory dies to the storage controller.

2. The storage module of claim 1, wherein one of the memory dies is configured to broadcast a synchronization packet to the other memory dies and to the storage controller.

3. The storage module of claim 2, wherein the storage controller is configured to provide the plurality of memory dies with a clock signal, and wherein each of the memory dies is configured to provide a ready/busy pulse at a different number of clock cycles after receiving the synchronization packet.

4. The storage module of claim 3, wherein the clock signal is a DQS data strobe signal.

5. The storage module of claim 1, wherein the storage controller comprises a scheduler that schedules when commands are to be sent to each of the memory dies based on each of the memory die's ready/busy status.

6. The storage module of claim 1, wherein at least one of the memory dies comprises a three-dimensional memory.

7. The storage module of claim 1, wherein the storage module is embedded in a host.

8. The storage module of claim 1, wherein the storage module is removably connected to a host.

9. The storage module of claim 1, wherein the storage module is a solid-state drive.

10. A storage module comprising:
a plurality of memory dies;
a bus having a plurality of data lines; and
a storage controller in communication with the plurality of memory dies via the bus, wherein the storage controller is configured to place the storage module in either a first mode of operation or in a second mode of operation;
wherein, in the first mode of operation, the plurality of data lines are used to transfer data between one of the memory dies and the storage controller; and
wherein, in the second mode of operation, the plurality of data lines are used to communicate ready/busy status information of the plurality of memory dies to the storage controller, wherein each of the memory dies sends its ready/busy status to the storage controller using a different one of the plurality of data lines.

11. The storage module of claim 10, wherein the storage controller is configured to switch from the second mode to the first mode when the storage controller wants to send a command to one of the memory dies.

12. The storage module of claim 10, wherein the storage controller comprises a scheduler that schedules when commands are to be sent to each of the memory dies based on each of the memory die's ready/busy status.

13. The storage module of claim 10, wherein at least one of the memory dies comprises a three-dimensional memory.

14. The storage module of claim 10, wherein the storage module is embedded in a host.

15. The storage module of claim 10, wherein the storage module is removably connected to a host.

16. The storage module of claim 10, wherein the storage module is a solid-state drive.

17. A storage module comprising:
a storage controller;
a bus; and
a plurality of memory dies in communication with the storage controller via the bus, wherein the bus has a ready/busy line that is shared among the plurality of memory dies, and wherein each of the plurality of memory dies is configured to indicate its ready/busy status by sending a pulse across the ready/busy line with pulse width that is different from those used by the other memory dies, and, to avoid collisions, each of the plurality of memory dies is further configured to wait a different number of clock cycles before attempting to send its pulse status after determining that the shared ready/busy line is in use.

18. The storage module of claim 17, wherein the storage controller comprises a scheduler that schedules when commands are to be sent to each of the memory dies based on each of the memory die's ready/busy status.

19. The storage module of claim 17, wherein at least one of the memory dies comprises a three-dimensional memory.

20. The storage module of claim 17, wherein the storage module is embedded in a host.

21. The storage module of claim 17, wherein the storage module is removably connected to a host.

22. The storage module of claim 17, wherein the storage module is a solid-state drive.

* * * * *